Figure 1:
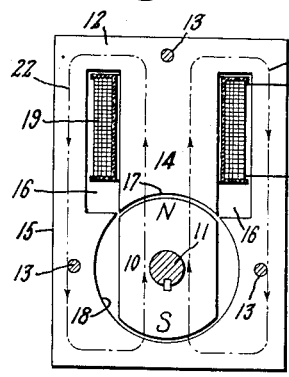

Nov. 13, 1934.  J. K. LEIBING  1,980,808
ALTERNATING CURRENT GENERATOR
Filed Sept. 28, 1933

Inventor:
Joseph K. Leibing,
by Harry E. Dunham.
His Attorney.

Patented Nov. 13, 1934

1,980,808

UNITED STATES PATENT OFFICE 1,980,808

ALTERNATING CURRENT GENERATOR

Joseph K. Leibing, Schenectady, N. Y., assignor to General Electric Company, a corporation of New York Application September 28, 1933, Serial No. 691,309

10 Claims. (Cl. 171—209)

My invention relates to alternating current dynamo electric machines and its object is to provide an improved machine of this class. More specifically, my invention relates to alternating current generators and its principal object is to provide a generator which is simple, rugged, and inexpensive to build, and which employs a permanent magnet and yet maintains a high generating accuracy over a long period, i. e., its voltage is not appreciably affected by the passage of time. Another important object of my invention is to provide a generator which is practically free from cyclic variations in its rotor counter torque due to pole pull. A still further object of my invention is to provide a generator capable of delivering a substantially rectangular wave shape alternating voltage.

As regards certain features of my invention designed to cause the generator to have a high generator accuracy over a long period, it is desirable to state here that several of these features will be advantageous only in those cases where the desired generator output is largely a matter of voltage, rather than wattage, i. e., where the required volt-ampere output of the generator will always be appreciably less than the maximum which the generator may be capable of delivering. In electrical measurements of the above mentioned class only a few milliamperes are usually required to operate the indicating voltmeter or other associated instrument, hence it is usually desirable to sacrifice maximum power for an increase in the period during which a high generating accuracy is maintained. On the other hand, apparatus such as ignition magnetos, usually require a maximum delivery of electrical power irrespective of any gradual weakening in their permanent magnets and for such apparatus the previously referred to features would not be desirable since they operate to limit the power output.

Certain structural features of my invention are desirable due to the advent during the past decade of permanent magnet steels having a high coercive force. With these steels a relatively large amount of magnetism may be forced across a small air gap by a magnet of considerably shorter length than that needed for the older type of magnet steel. This feature of shortness, however, results in a proportionally reduced length of leakage path, so that it becomes quite important that the magnet be at all times provided with a return path for its flux or it will experience a considerable amount of demagnetization. The provision of a proper return path at all times for the permanent magnet of the generator forms an important feature of my invention.

At present, I believe that the most important practical application of my improved machine is its use in connection with electrical measurements, for example, as a tachometer generator. In explaining the operating principles of my machine, and the preferred constructions thereof, reference will, therefore, be made to its use as a tachometer generator. It should be understood, however, that this is done only for illustrative purposes since my improved machine is not restricted to this specific use.

Briefly described, one form of my improved generator comprises a rotatable disc type permanent magnet and a stator consisting of a plurality of one-piece laminations of magnetic material and a preformed coil to function as the armature winding. Each lamination has an inwardly projecting tongue whose free end, when in position, is separated by an air gap from the periphery of the magnet. The laminations are so formed that one lamination after another can be readily assembled to have the preformed coil surround its tongue, and when the desired number of laminations are thus assembled they are tightly clamped together. Furthermore, the laminations and magnet are so shaped that as the latter rotates the reluctance of the return path for the magnet flux remains substantially constant, and yet an alternating magnetic flux is caused to thread the preformed coil with a substantially constant rate of change in the magnitude thereof.

My invention, however, will be best understood from the following description when considered in connection with the accompanying drawing, while those features of my invention which are believed to be novel and patentable are pointed out in the appended claims.

Figure 2:
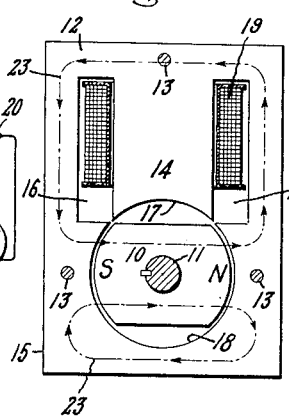
Figure 7:
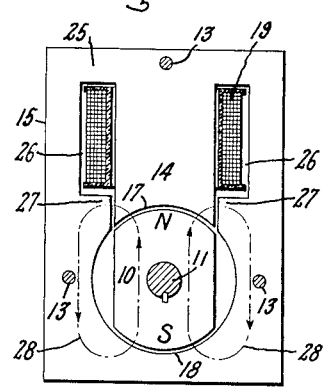
Figure 8:
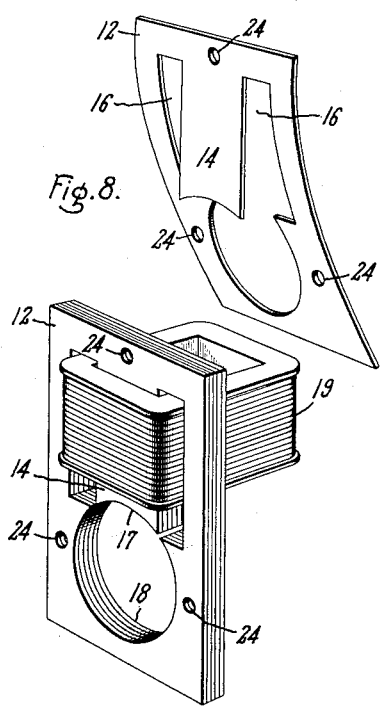
Figure 9:
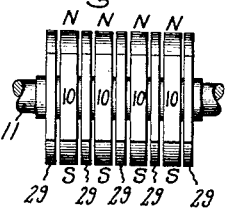
Figure 4:
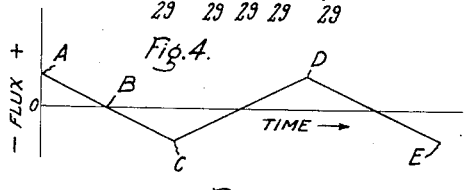
Figure 5:
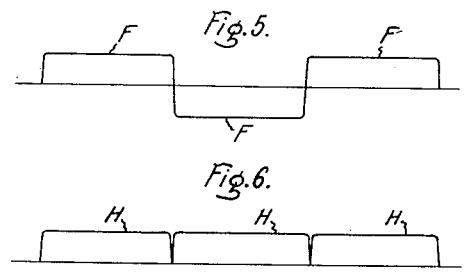
Figure 6:
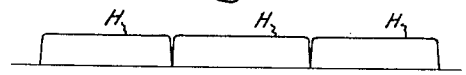
Figure 3:
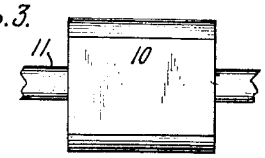

Fig. 1 of the drawing represents an end view of one form of my generator with its rotatable permanent magnet in that position where maximum magnetic flux is threading the armature winding and Fig. 2 represents a similar view with the magnet in that position where no magnetic flux is threading the armature winding. Fig. 3 represents a side view of the rotatable permanent magnet assembled in the generators shown in Figs. 1, 2, and 7. Fig. 4 represents a graph showing the variation of magnetic flux through the armature winding of my generator with respect to time. Fig. 5 represents a graph showing the wave form of the alternating voltage induced in the armature winding of my generator; and Fig. 6 represents a graph showing the wave form of this voltage after it is rectified by a full wave rectifier. Fig. 7 represents an end view of another embodiment of my improved generator. Fig. 8 represents a perspective view showing how each lamination may be readily assembled so that the preformed coil surrounds its tongue. Fig. 9 represents a rotatable permanent magnet system consisting of a plurality of suitably arranged permanent magnets and soft iron plates or keepers that may be employed in my generator instead of the magnet shown in Fig. 3. Similar parts in the various figures are represented by the same reference characters.

In Fig. 1 I have represented by numeral 10 a single rotatable permanent magnet, preferably made of cobalt steel, the magnet being secured to a shaft 11 which is driven by the device whose speed is to be measured. A side view of magnet 10 and a portion of shaft 11 is shown in Fig. 3. For the sake of illustration, I have shown a two-pole magnet but I wish it understood that magnets of other numbers of poles may equally as well be used. Magnet 10 is magnetized along its diameter and has two salient pole pieces of alternate magnetic polarities indicated by letters N and S respectively. With the two-pole construction each pole face of the magnet has a circular periphery occupying substantially 90 degrees of arc and the centers of the two pole faces are separated 180 degrees, the two circular peripheries being connected by the two straight side portions of the magnet, each straight side portion forming a chord subtending 90 degrees of arc. Surrounding magnet 10 is a laminated magnetic structure consisting of a plurality of one-piece laminations of magnetic material clamped together by suitable clamping devices, such as three rivets. Since Fig. 1 is an end view, only one of these laminations is shown and is represented by numeral 12, whereas the body portion of each rivet is represented by numeral 13. Each lamination has an inner circular surface surrounding magnet 10 and is separated therefrom by an air gap of substantially constant length at all points. Each lamination also has a tongue 14 separated from the main body portion 15 of the lamination by two slots 16 therein, this tongue projecting inwardly from the main body portion and terminating in an inner circular surface represented by numeral 17 which occupies substantially 90 degrees. The main body portion 15 has an inner circular surface represented by numeral 18 which has the same diameter as the circular surface 17 of tongue 14, the two circular surfaces being separated by breaking the material at the two inner corners of slots 16. A preformed coil 19 surrounds tongue 14, the terminals of this coil being preferably connected in series with a full wave rectifier 20 to a direct current indicating instrument 21 whose scale is preferably calibrated in R. P. M. Of course, if desired a simple alternating current type indicating instrument may be connected directly to the terminals of coil 19 in place of rectifier 20 and instrument 21.

A description now follows of the operation of the generator illustrated in Figs. 1 and 2. Since every element of the surface of the arc-shaped poles of magnet 10 is in juxtaposition to one circular surface or another of lamination 12, and since the magnet is separated from the lamination by an air gap which has the same length at every surface element of the arc-shaped poles and at every angular position of the magnet, it is evident that the density of the flux issuing from the magnet poles is uniform over the whole surface of the polar arcs and that the magnitude of this flux is the same with every rotor position. This of course requires that the material of which laminations 12 are made should have a high magnetic permeability, so that the reluctance of the return flux path through the laminations can be considered to be negligible as compared to the reluctance of the air gap between the magnet and the laminations. Thus, irrespective of whether the return flux path through the laminations be relatively long, as indicated by dot and dash lines 22 in Fig. 1, or relatively short, as indicated by dot and dash lines 23 in Fig. 2, the total reluctance of the return path of the magnet will be substantially constant and will be concentrated in the air gap between the magnet and the laminations. A further requirement for fulfillment of this ideal condition is that coil 19 be carrying so small a current as to produce a very small counter-magnetomotive force in tongue 14 to oppose the magnetomotive force of the magnet.

Since the magnitude of the flux issuing from the poles of magnet 10 is constant and is distributed uniformly over the whole surface of the polar arcs, it is evident that as the magnet poles pass under tongue 14 the magnitude of the flux passing into the tongue at any instant will be substantially directly proportional to the amount of tongue polar area exposed to the pole of the magnet at that instant. This exposed area varies directly with the angular position of the magnet, hence the magnitude of the flux passing through tongue 14 varies directly with the angular position of the magnet. Consequently, if the angular position of the magnet changes at a constant rate, i. e., turns at a constant speed, the flux threading tongue 14 will vary at a constant rate. From this it follows that a substantially constant voltage will be induced in coil 19 throughout each half cycle, while the polarity of this voltage will of course reverse with each reversal of the algebraic sign of the rate of change of flux threading the coil. It will be seen that practically at the instant the trailing edge of one pole face of magnet 10 leaves the leading edge of tongue 14 during rotation of the magnet the leading edge of the other pole face of the magnet comes into line with the trailing edge of the magnet tongue. Consequently, the magnitude of the flux threading coil 19 is continuously varying at a substantially constant rate with an almost abrupt reversal in the direction in which this flux threads the coil at the instant the trailing edge of a pole face of the magnet leaves the leading edge of the tongue as the magnet rotates.

Thus, assume for example, that magnet 10 in Fig. 1 is being driven in a clockwise direction. As previously stated, with the magnet in the position shown in Fig. 1, the maximum value of flux is threading tongue 14, the paths of this flux being represented by dot and dash lines 22. This maximum value of flux threading the tongue is represented for example by letter A in Fig. 4. As the magnet is rotated from the position shown in Fig. 1 the magnitude of the flux threading tongue 14 decreases at a substantially constant rate, assuming of course, that the magnet is being rotated at a substantially constant angular rate, and when the magnet has reached the position shown in Fig. 2 no flux threads tongue 14, as represented by letter B in Fig. 4, the flux from the magnet now threading only the main body portion of the lamination as indicated by the dot and dash lines 23 in Fig. 2. As magnet 10 is rotated further from the position shown in Fig. 2 a flux commences to thread tongue 14 in the opposite direction from that shown in Fig. 1 and this flux increases at substantially the same constant rate until it reaches its maximum value as indicated by letter C in Fig. 4 when the entire face of the pole piece having S polarity faces the inner circular surface of the tongue. From this description it should be clear that the variation in the magnitude of the flux threading tongue 14 with respect to time when the magnet is rotating at a substantially constant angular velocity will be represented by the zig-zag line ABCDE shown in Fig. 4. It therefore follows that the alternating voltage induced in coil 19 will have a substantially rectangular wave shape as represented, for example, by letter F in Fig. 5, and the rectified d. c. voltage impressed on instrument 21 in Fig. 1 will have substantially the shape shown in Fig. 6 as represented by the letter H. From Figs. 5 and 6 it is clear that at any given speed of magnet 10 the magnitude of the a. c. voltage in Fig. 5 and of the d. c. voltage in Fig. 6 is substantially constant except during the very short period when the a. c. voltage induced in coil 19 almost abruptly changes from maximum value in one direction to maximum value in the opposite direction.

The generating of a substantially rectangular wave shape a. c. voltage is a highly practical advantage for the following reason. Assume, for example, that a tachometer generator is employed that delivers a substantially sinusoidal a. c. voltage. The voltage impressed on instrument 21 will then be a succession of unidirectional voltage impulses each being sinusoidal in shape, hence a unidirectional voltage having a continuously varying magnitude is impressed on the instrument. When the rotating magnet of the generator is driven at a high speed the frequency of these voltage impulses is so high that the instrument pointer remains practically stationary because the inertia of the instrument moving element is sufficient to prevent it from moving as the voltage varies. This, however, is not the case when the magnet is rotating at a fairly low speed, hence causing the instrument pointer to oscillate. The same will of course be true when an a. c. type of instrument is directly connected to the terminals of coil 19. It is, therefore, difficult if not impossible, to measure with a reasonable degree of accuracy the low speed of a rotating body when a sinusoidal wave shape is used. With my generator, however, the magnitude of the voltage impressed on the indicating instrument at any given speed, whether the latter is of the a. c. type connected directly to the terminals of coil 19 or is of the d. c. type connected to the terminals of coil 19 through a full wave rectifier, varies only during the very short period that the alternating voltage induced in the armature coil almost abruptly reverses. Since this period is very short even at relatively low speeds of rotation of the magnet, it is possible to measure with a high degree of accuracy the low speed of a rotating body as well as medium and high speeds thereof.

Due to the fact that the adjacent pointed ends of tongue 14 and main body portion 15 of lamination 12 become readily saturated no appreciable amount of flux passes transversely across the lower end of the tongue from pole to pole of the magnet. Consequently, practically all the magnet flux passes through the laminations either as shown by lines 22 in Fig. 1 or lines 23 in Fig. 2. This together with the fact that the magnitude of the flux passing through the magnet remains substantially constant as it rotates, as previously explained, is productive of the two following important practical advantages. First, it practically prevents cyclic variations in the rotor counter-torque due to pole pull such as takes place in the common types of tachometer generators, hence my generator, when supplying a small electrical load, such as energizing an indicating voltmeter, may be used for measuring the speed of a rotating body having a very small driving torque because when the generator is so used it will require more nearly uniform torque to drive its magnet at any given speed than is usually the case with prior art generators. Second, the tendency for the magnet to demagnetize with the passage of time is less than in prior art tachometer generators, hence there is less tendency for the indicating instrument energized by my generator to give erroneous indications as time passes than is the case with prior art magneto generators.

In addition to the above described advantages, my generator has the advantage of being rugged, simple and inexpensive to build. Thus, from Figs. 1 and 3 it can be seen that magnet 10 is not only simple and rugged, but also is inexpensive to build because it is made from one piece and requires a small number of simple, inexpensive machining operations. The same is true of laminations 12 because each lamination is made from one piece which can be punched out in a single operation by a simple die. In addition, the one piece laminations avoid the use of joints in the magnetic circuit, thus tending to decrease the reluctance of the circuit. Furthermore, by employing a preformed coil 19, as best seen in Fig. 8, the coil can not only be built cheaper than by winding a coil over the laminations, but it can also be layer wound and thus be made mechanically stronger to resist vibration, etc., than could a haphazard winding wound over the laminations. At the same time, the structure of the laminations is such as to provide ample winding space for a large number of coil turns. Moreover, the laminations and coil may be readily assembled. Thus, as shown by the upper right hand lamination 12 in Fig. 8, each lamination is bent sufficiently so that its tongue 14 can be inserted into the hole of coil 19 and the two opposite sides of the latter into the two slots 16 of the lamination, the latter being sufficiently flexible not to take a permanent set when thus bent. After the required number of laminations are thus assembled, rivets or other clamping devices are passed through holes 24 of the laminations and the latter securely clamped together.

As previously mentioned, a tachometer generator is ordinarily required to supply only a very small current, its main function being to supply a voltage whose magnitude varies properly with the speed of the device driving the tachometer magnet. This is also true of my generator, hence when normal current flows through coil 19 very little counter-magnetomotive force is set up in tongue 14 to oppose the counter-magnetomotive force of magnet 10. It is conceivable, however, that for some reason the output circuit of coil 19 may become accidentally short circuited, thus causing a larger than normal current to flow through the coil. This will produce a substantial counter-magnetomotive force in tongue 14 to oppose the magnetomotive force of magnet 10, hence causing a decrease in the magnitude of the flux passing through the magnet during a portion of its revolution. This in turn may produce harmful consequences, as previously referred to, depending upon the rotor speed at which this short circuit occurs. The embodiment of my generator shown in Fig. 7, however, overcomes this objection by so shaping each lamination that a part of its main body portion 15 in the vicinity of the free end of tongue 14 functions as a magnetic shunt for the tongue when the current flowing through coil 19 appreciably exceeds its normal operating value.

The generator shown in Fig. 7 is similar to that in Fig. 1 except that each lamination thereof is shaped slightly different from that shown in Fig. 1. In Fig. 7 the lamination is represented by numeral 25 and it has two slots 26 so shaped that the main body portion 15 of the lamination has two projections 27 each separated from the lower end of tongue 14 by a comparatively long and narrow part of slot 26 for quite a distance up from the lower end of the tongue, thus forming a magnetic shunt for the tongue. The width of the two narrow slots just mentioned is made as small as practicable and yet permit the magnetic reluctances across these slots to be relatively high as compared to the much lower reluctance path afforded by the tongue 14 itself, under normal operating conditions. Thus, under normal operating conditions the bulk of the flux entering the lower end of tongue 14 from the magnet will pass through that portion of the tongue which is surrounded by coil 19 and very little flux will leak across the long and narrow slots to projections 27. However, if coil 19 should be short circuited while magnet 10 is rotating at sufficient speed to cause appreciably more than normal current to flow through coil 19 and thus cause to a greater or less extent the blocking of the flux path through that portion of tongue 14 surrounded by the coil, the magnet flux instead of being weakened to a harmful extent will then complete its circuit across the comparatively long and narrow air gaps to projections 27 and take the path indicated by the dot and dash lines 28. It is therefore clear that this functions as a comparatively low reluctance magnetic shunt for the tongue and practically all the flux from the magnet will take the paths indicated by lines 28 under the short circuit condition referred to above. It will of course be understood by those skilled in the art that by thus limiting the amount of armature reaction which coil 19 can exert upon the magnet flux the maximum current obtainable from the coil will be correspondingly limited. As long, however, as the armature reaction is kept small any desired number of turns may be employed in coil 19 to obtain voltages as high as desired, within reasonable limits. Using a high number of turns in coil 19 a short circuit thereof may be made which would be ruinous to the magnet flux if the previously described magnetic shunt for the tongue were not employed but which is nearly harmless when the magnetic shunt is employed. It is clear that each lamination 25 in Fig. 7 may be assembled with its coil 19 as illustrated and described in connection with Fig. 8.

The construction of the permanent magnet rotor shown in Fig. 9 shows a modification suitable for use in the stator elements shown in Figs. 1, 2 and 7, especially with those shown in Figs. 1 and 2 since they do not have the magnetic shunts for tongue 14. The rotor shown in Fig. 9 can be completely removed from the stator frame without harmful effect upon the residual magnetism of the rotor and the process of strongly magnetizing the rotor magnets while so removed is made possible, thus resulting in a distinct manufacturing advantage. This rotor consists of a plurality of similar magnets 10 and a plurality of similar plates 29 of a magnetic material having a relatively low reluctance, all secured to shaft 11 so that each magnet 10 is between two plates 29 and is separated therefrom by an air gap. Although each plate 29 may be a disc I have shown them as having the shape of magnets 10 for simplicity of illustration. Magnets 10 are arranged so that the centers of their arc shaped pole faces are substantially in alignment in a direction parallel to the axis of shaft 11. The rotor is initially magnetized by subjecting it to a powerful magnetic field. All the top pole pieces of the magnets will then have the same polarity, for example, N polarity, whereas all the bottom poles will then have S polarity. Plates 29 will not become permanently magnetized to any appreciable extent due to flux retained by them but will function as return paths for the flux of magnets 10 and will carry such flux as is supplied to them by the magnets. The air gap between each magnet 10 and its adjacent plate 29 is appreciably greater than the air gap that will exist between the pole piece of a magnet and tongue 14 when the pole piece faces the tongue after the rotor is assembled in the generator. Plates 29, therefore, provide a fairly low reluctance path for the flux of magnets 10 before the rotor is assembled in the generator, thus tending to prevent any appreciable decrease in the strength of each magnet from its original strength immediately after it is magnetized. Plates 29 also tend to function as magnetic shunts under short circuit conditions as described in connection with Fig. 7.

In accordance with the provisions of the patent statutes, I have described the principles of operation of my invention, together with the apparatus which I now consider to represent the best embodiments thereof, but I desire to have it understood that the apparatus shown and described is only illustrative and that the invention may be carried out by other means.

What I claim as new and desire to secure by Letters Patent of the United States, is:

1. A dynamo electric machine comprising two relatively movable bodies, one of said bodies comprising a magnetic member having a plurality of salient projections with each projection having a peripheral surface occupying 90 electrical degrees and with the centers of every two adjacent salient projections separated 180 electrical degrees, and the other of said bodies comprising a magnetic structure having a peripheral surface which is adjacent the peripheral surfaces of said projections and which is separated therefrom by an air gap, said magnetic structure having two slots spaced apart to define a section of the magnetic structure whose corresponding surface at said air gap occupies 90 electrical degrees, one of said bodies being adapted to produce a unidirectional magnetomotive force, and an armature winding surrounding a portion of the other body, the shapes of said bodies being such that their relative motion causes an alternating magnetic flux to thread said armature winding with a substantially constant rate of change in the magnitude of this magnetic flux, whereby an alternating voltage having a substantially rectangular wave shape is induced in said armature winding.

2. A dynamo electric machine comprising a magnet having a plurality of salient pole pieces of alternate magnetic polarities with each pole face occupying 90 electrical degrees and with the centers of every two adjacent pole pieces separated 180 electrical degrees, a magnetic structure having a peripheral surface which is adjacent the pole faces of said magnet and which is separated therefrom by an air gap, said magnet and magnetic structure being relatively movable, said magnetic structure having two slots spaced apart to define a section of the magnetic structure whose corresponding surface at said air gap occupies 90 electrical degrees, and an armature winding surrounding said defined section of the magnetic structure, the shapes of said magnet and magnetic structure being such that their relative motion causes an alternating magnetic flux to thread said defined section of the magnetic structure with a substantially constant rate of change in the magnitude of this magnetic flux, whereby an alternating voltage having a substantially rectangular wave shape is induced in said armature winding.

3. A dynamo electric machine comprising a magnet having a plurality of salient pole pieces of alternate magnetic polarities with each pole face occupying 90 electrical degrees and with the centers of every two adjacent pole pieces separated 180 electrical degrees, a magnetic structure having a peripheral surface which is adjacent the pole faces of said magnet and which is separated therefrom by an air gap, said magnet and magnetic structure being relatively movable, said magnetic structure having two slots spaced apart to define a section of the magnetic structure whose corresponding surface at said air gap occupies 90 electrical degrees, and an armature winding surrounding said defined section of the magnetic structure, the shapes and dimensions of said magnet and magnetic structure being such that during their relative rotation the magnetic reluctance of the entire magnetic circuit for the magnetic flux of said magnet remains substantially constant and an alternating magnetic flux threads said defined section of the magnetic structure with a substantially constant rate of change in the magnitude of the last mentioned flux.

4. A dynamo electric machine comprising a magnet having a plurality of salient pole pieces of alternate magnetic polarities with each pole piece having a circular peripheral surface occupying 90 electrical degrees and with the centers of every two adjacent pole pieces separated 180 electrical degrees, a magnetic structure having a circular surface which is concentric with the circular peripheral surfaces of said pole pieces and which is separated therefrom by an air gap, said magnet and magnetic structure being relatively rotatable, said magnetic structure having two slots spaced apart to define a section of the magnetic structure whose corresponding circular surface at the air gap occupies 90 electrical degrees, and an armature winding surrounding said defined section of the magnetic structure, the shapes of said magnet and magnetic structure being such that their relative rotation causes an alternating magnetic flux to thread said defined section of the magnetic structure with a substantially constant rate of change in the magnitude of this magnetic flux, whereby an alternating voltage having a substantially rectangular wave shape is induced in said armature winding.

5. A dynamo electric machine comprising a magnet having a plurality of salient pole pieces of alternate magnetic polarities with each pole piece having a circular peripheral surface occupying 90 electrical degrees and with the centers of every two adjacent pole pieces separated 180 electrical degrees, a magnetic structure having a circular surface which is concentric with the circular peripheral surfaces of said pole pieces and which is separated therefrom by an air gap, said magnet and magnetic structure being relatively rotatable, said magnetic structure having two slots spaced apart to define a section of the magnetic structure whose corresponding circular surface at the air gap occupies 90 electrical degrees, and an armature winding surrounding said defined section of the magnetic structure, the shapes and dimensions of said magnet and magnetic structure being such that during their relative rotation the magnetic reluctance of the entire magnetic circuit for the magnetic flux of said magnet remains substantially constant and an alternating magnetic flux threads said defined section of the magnetic structure with a substantially constant rate of change in the magnitude of the last mentioned flux.

6. A dynamo electric machine comprising a stationary magnetic structure having two inner circular surfaces of substantially the same diameter, one of said circular surfaces occupying 90 electrical degrees, said structure having two slots which separate said circular surfaces and which extend toward but do not reach the end of said structure so as to form a section of the structure which is integral therewith, intermediate the sides thereof, projects inwardly therefrom and has said inner circular surface occupying 90 electrical degrees, a rotatable permanent magnet within the inner circular surfaces of said structure, said magnet having a plurality of salient pole pieces of alternate magnetic polarities with each pole piece having a circular peripheral surface occupying 90 electrical degrees and with the centers of every two adjacent pole pieces separated 180 electrical degrees, the circular peripheral surfaces of said pole pieces being concentric with the circular surfaces of said structure, and an armature winding surrounding said inwardly projecting section of said structure, the shapes of said magnetic structure and magnet being such that rotation of the latter causes an alternating magnetic flux to thread said inwardly projecting section of the magnetic structure with a substantially constant rate of change in the magnitude of this magnetic flux.

7. A dynamo electric machine comprising a stationary laminated magnetic structure consisting of a plurality of similar one-piece laminations, each lamination having a tongue separated from the main body portion of the lamination by two slots therein, said tongue projecting inwardly from the main body portion and terminating in an inner circular surface occupying 90 electrical degrees, said body portion having an inner circular surface separated from the circular surface of said tongue by the ends of said slots, said circular surfaces having substantially the same diameter, a preformed hollow shaped coil surrounding the tongues of said laminations, each lamination being so flexible and its slots being so shaped that it can be bent sufficiently without taking a permanent set to slip its tongue into the hole of said coil and slip the two sides of the latter through the two slots of the lamination, and a one-piece rotatable permanent magnet within the circular surfaces of said laminations, said magnet having a plurality of salient pole pieces of alternate magnetic polarities with each pole piece having a circular peripheral surface occupying 90 electrical degrees and with the centers of every two adjacent pole pieces separated 180 electrical degrees, the circular surfaces of said pole pieces being concentric with the circular surfaces of said laminations, the shapes of said magnetic structure and magnet being such that rotation of the latter causes an alternating magnetic flux to thread said inwardly projecting tongues of said laminations with a substantially constant rate of change in the magnitude of this magnetic flux.

8. A dynamo electric machine comprising a permanent magnet having a plurality of salient pole pieces of alternate magnetic polarities, a magnetic structure having a peripheral surface which is adjacent the peripheral surfaces of said pole pieces and which is separated therefrom by an air gap, said magnet and magnetic structure being relatively movable, said magnetic structure having a tongue separated from the main body portion of the structure by two slots therein, said tongue projecting inwardly from the main body portion and terminating at said air gap, and an armature winding surrounding said tongue, said main body portion and slots being so shaped in the vicinity of the free end of said tongue near said air gap that the nearby body portion functions as a comparatively low reluctance magnetic shunt for the tongue when the current flowing through said armature winding appreciably exceeds its normal operating value.

9. A dynamo electric machine comprising a rotatable magnet system having a plurality of similar permanent magnets alternately arranged with a plurality of magnetic plates so that each magnet is between two plates and is separated therefrom by air gaps, each magnet having a plurality of salient pole pieces of alternate magnetic polarities with each pole piece having a circular peripheral surface occupying a predetermined number of electrical degrees, said magnets being arranged with the centers of their similar magnetic poles substantially in alignment in a direction parallel to the axis of rotation of said magnet system, a stationary magnetic structure having an inner circular surface surrounding said magnet system and concentric with the circular surfaces of said pole pieces, said magnetic structure having a tongue separated from the main body portion of the structure by two slots therein, said tongue projecting inwardly from the main body portion and terminating in an inner circular surface occupying substantially the same number of electrical degrees as that occupied by the peripheral surface of each pole piece, and an armature winding surrounding said tongue, the air gap between the adjacent circular surfaces of said magnets and magnetic structure being a predetermined amount smaller than the air gap between each magnet and its adjacent magnetic plate.

10. In a dynamo-electric machine, a stator core member made up of a plurality of one piece laminations of magnetic material, each of said laminations having a circular opening and two substantially rectangular shaped parallel slots therein, inner corners only of such slots extending to the circular opening so as to form an inwardly projecting tongue of uniform width between the slots facing the circular opening with the tips of said tongue separated from the main body of the lamination by narrow air gaps, and a preformed hollow shaped coil surrounding the tongue portions of said laminations and having sides, of greater thickness than the dimensions of said air gaps, extending through the slot openings, said coil being so positioned by individually assembling the laminations by flexing the tongue portion of each lamination out of the plane of the lamination so as to open the air gaps at the tip of the tongue, passing side portions of the coil therethrough into the slots, and then allowing the tongue portion to return to its normal position substantially closing the slots.

JOSEPH K. LEIBING.